(12) United States Patent
Brouillac et al.

(10) Patent No.: US 11,266,269 B2
(45) Date of Patent: Mar. 8, 2022

(54) MILL FOR SPICE PRODUCTS

(71) Applicant: PEUGEOT SAVEURS, Quingey (FR)

(72) Inventors: Nicolas Brouillac, Saint Vit (FR); Samuel Savatier, Buffard (FR); Gaetan Carrier, Villaz (FR)

(73) Assignee: PEUGEOT SAVEURS, Quingey (FR)

( * ) Notice: Subject to any disclaimer, the term of this patent is extended or adjusted under 35 U.S.C. 154(b) by 133 days.

(21) Appl. No.: 16/775,594

(22) Filed: Jan. 29, 2020

(65) Prior Publication Data

US 2020/0237156 A1 Jul. 30, 2020

(30) Foreign Application Priority Data

Jan. 29, 2019 (FR) ..................... 19 00762

(51) Int. Cl.
| | | |
|---|---|---|
| *A47J 42/04* | (2006.01) | |
| *A47J 42/08* | (2006.01) | |
| *A47J 42/32* | (2006.01) | |
| *A47J 42/34* | (2006.01) | |
| *A47J 42/38* | (2006.01) | |
| *A47J 42/02* | (2006.01) | |

(52) U.S. Cl.
CPC ............... *A47J 42/04* (2013.01); *A47J 42/08* (2013.01)

(58) Field of Classification Search
CPC .. A47J 42/04; A47J 42/08; A47J 42/32; A47J 42/34; A47J 42/38; A47J 42/02
See application file for complete search history.

(56) References Cited

U.S. PATENT DOCUMENTS

| 8,348,183 B2* | 1/2013 | Mertens | B02C 17/14 |
| | | | 241/2 |
| 2006/0138263 A1* | 6/2006 | Thornton | A47J 43/27 |
| | | | 241/169.2 |
| 2015/0157167 A1* | 6/2015 | Eicher | A47J 42/06 |
| | | | 99/286 |

FOREIGN PATENT DOCUMENTS

| CN | 105 411 428 A | | 3/2016 | |
| DE | 202 03 057 U1 | | 4/2002 | |
| GB | 2 399 518 A | | 9/2004 | |
| GB | 2399518 B | * | 4/2005 | ............ B02C 19/08 |
| GB | 2 496 891 A | | 5/2013 | |
| GB | 2496891 A | * | 5/2013 | ............ A47J 42/04 |
| JP | 2018015073 A | * | 2/2018 | ............ B02C 7/11 |
| WO | 2008 086583 A1 | | 7/2008 | |

OTHER PUBLICATIONS

English translate (JP2018015073A), retrieved date Jul. 26, 2021.*

* cited by examiner

*Primary Examiner* — Faye Francis
*Assistant Examiner* — Mohammed S. Alawadi
(74) *Attorney, Agent, or Firm* — Craft Chu PLLC; Andrew W. Chu

(57) ABSTRACT

The mill for spice products, in particular such as cinnamon sticks, houses a reservoir for storing the spice product. The reservoir communicates through a passage, with a grinding mechanism. The reservoir includes a mechanism for fragmenting the spice product. The mechanism for fragmenting are defined by a crusher of the spice product.

13 Claims, 4 Drawing Sheets

MILL FOR SPICE PRODUCTS

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to a mill for spice products, in particular such as cinnamon sticks, housing a reservoir for storing the spice product communicating, through a passage, with a grinding mechanism, said reservoir being equipped with means for fragmenting the spice product.

More specifically, the invention more particularly relates to manual or electric mills suitable for transforming course, dry, hard and sometimes large spices, in particular such as allspice, long pepper, cloves, cinnamon, pumpkin seeds, nuts, peppercorns, sugar cubes, tea, etc., from their raw state to a texture suitable both for the considered use, and an optimal expression of their flavors.

2. Description of Related Art Including Information Disclosed Under 37 CFR 1.97 and 37 CFR 1.98

Currently, many accessories for transforming spice products into fine particles, or even powder, based on different operating principles, are commercially available.

A first category conventionally includes a grinding mechanism and a reservoir, which may be transparent and fillable, in which a spice is stored, possibly whole, or reduced beforehand into fragments of a size compatible with the structure of the grinding mechanism. In this respect, this step, done before the filling of the reservoir, can be done manually, using a knife or grater, for example, or at least one spice shaker specifically dedicated to this use, and including suitable fragmenting means.

It is also possible to use devices made up of a reservoir and grating means, recommended for powdering products such as nutmeg or cinnamon sticks.

Furthermore, a more comprehensive device, based on a combination of chopping means and grating means, described in publication EP 1,605,805, is also commercially available. However, although it is studied to powder products with a relatively soft or brittle texture in raw state, in particular such as garlic, chili, orange peel, etc., it has been observed that this device is ineffective for products with a hard and dry texture.

It should also be emphasized that in order to preserve the volatile flavors of spices as much as possible, their transformation into a more or less fine powder absolutely must be done from their raw state and at the time of their consumption or preparation of the dish into which they are incorporated. Thus, spice lovers are generally reluctant to purchase them pre-shredded or already finely ground, since they are aware of the loss of quality caused. Accessories based on the implementation of pre-transformed spice products will therefore not satisfy such an audience.

Additionally, the grinding mechanism equipping standard mills is suitable for grinding products or product fragments with a given size. Grinding products with a very different size, for example cinnamon sticks or dried chilis, is therefore impossible using a same mill of this type. In other words, this solution involves having several mills, each dedicated to a given category of spice.

The technology consisting of grating the spice is also not fully satisfactory, since the obtained grinding remains too coarse relative to the conventionally allowed quality criteria, according to which the latter is recognized when 80% of the component particles have a diameter smaller than 500 µm. Additionally, this type of technology does not make it possible to adjust the fineness of the grinding, which is essential in the case of peppers, for example. The same is true for accessories of the "shaker" type, only making it possible to fragment and mix the spice products coarsely, but in no way to reduce them finely into powder.

Thus, the present applicant has observed that none of the accessories currently on the market represent a satisfactory solution to reduce multiple different dry, hard and sometimes large spice products into powder, when they are used raw, and therefore unaltered by prior treatment.

BRIEF SUMMARY OF THE INVENTION

The present invention therefore aims to propose a new type of mill specifically studied to provide, from dry and hard spice products, used raw to benefit fully from their gustatory and nutritional qualities, a fine and homogeneous grinding, in which at least 80% of the obtained particles have a diameter smaller than 500 µm. Another aim of the invention is to provide, for such a mill, a robust structure making it possible to guarantee the longevity thereof and to preserve user safety. The considered solution also aims to free the user from the need to have a given mill for a given product, through a configuration suitable for implementation with a plurality of different spice products.

To that end, the present invention relates to a mill of the type indicated in the preamble, characterized in that the fragmenting means are defined by crushing means of the spice product.

It is in particular provided that the crushing means include at least one solid body positioned freely in the reservoir.

According to a preferred embodiment variant of the invention, the reservoir is defined by a hollow cylinder, with inner diameter d, closed by an arch and having a bottom including at least one inlet orifice towards the passage, while the solid body is defined by a ball with diameter D smaller than d.

Furthermore, in this case, the diameter d of the reservoir is preferably greater than or equal to 1.5 times the diameter D of the ball.

An additional feature of the mill according to the invention is defined by the fact that the ball preferably has a mass m of between 55 g and 75 g, while the reservoir has a height L of between 3 cm and 15 cm as a function of the type of spice to be crushed.

In order to further improve the effectiveness of the fractionation, the inner face of the reservoir can further include a plurality of ribs, which can be distributed radially over the arch and/or the bottom of said reservoir.

According to another feature, the bottom of the reservoir preferably includes several orifices delimited by said ribs.

The mill according to the invention is also characterized in that it is preferably equipped with damping means arranged between the reservoir and the grinding mechanism, and making it possible to improve its robustness.

Furthermore, in some cases, the reservoir may have a structure in which it is formed by two separable parts.

In this case, the mill according to the invention may advantageously include damping means positioned between the two separable parts.

According to one conceivable embodiment variant, the damping means include at least one ring made from an elastomeric material.

According to the invention, it is further provided to associate means for adjusting the fineness of the milling with the grinding mechanism of the present mill.

In order to avoid any blocking of the grinding mechanism by a spice fragment, said grinding mechanism is preferably provided with means for mixing the fragmented spice product.

The invention will be better understood, and other features and advantages of the invention will appear in light of the following description of one embodiment variant of the mill according to the invention provided solely as an example and non-limitingly.

BRIEF DESCRIPTION OF THE SEVERAL VIEWS OF THE DRAWINGS

The description is to be read in connection with the appended drawings.

DETAILED DESCRIPTION OF THE INVENTION

Figure 1:
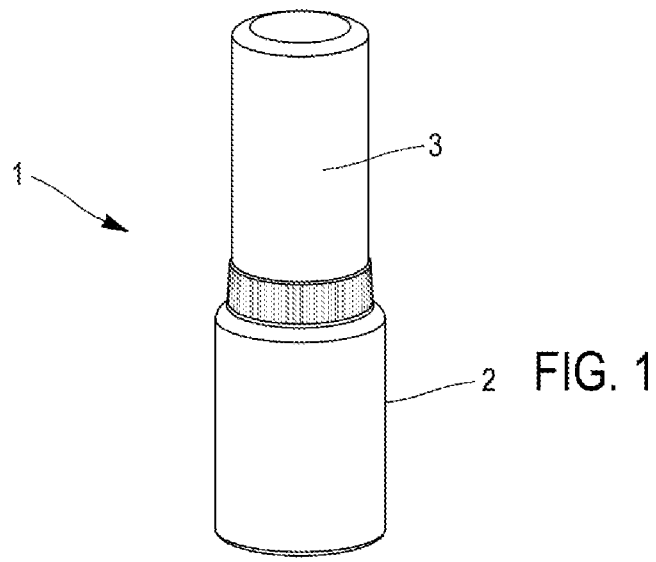
FIG. 1 is a front perspective view of an embodiment variant of a mill according to the invention, in which the reservoir is made up of two separable parts, called "upper part" and "lower part".

According to the figures, in the illustrated embodiment variant, the spice mill 1 according to the invention includes a body 2 housing a reservoir 3 for storing a spice product communicating, through a passage 5, with a grinding mechanism 4. The latter conventionally includes a toothed bulb 40, rotatable in a toothed cup 41 through a rod 42 suitable for being actuated by a user manipulating the mill 1.

It is specified that the different component parts of the mill 1 are manufactured from materials conventionally used for that purpose, suitable for the food field, such as plastic, wood, ceramic, metal, or any other material having equivalent properties.

Figure 2:
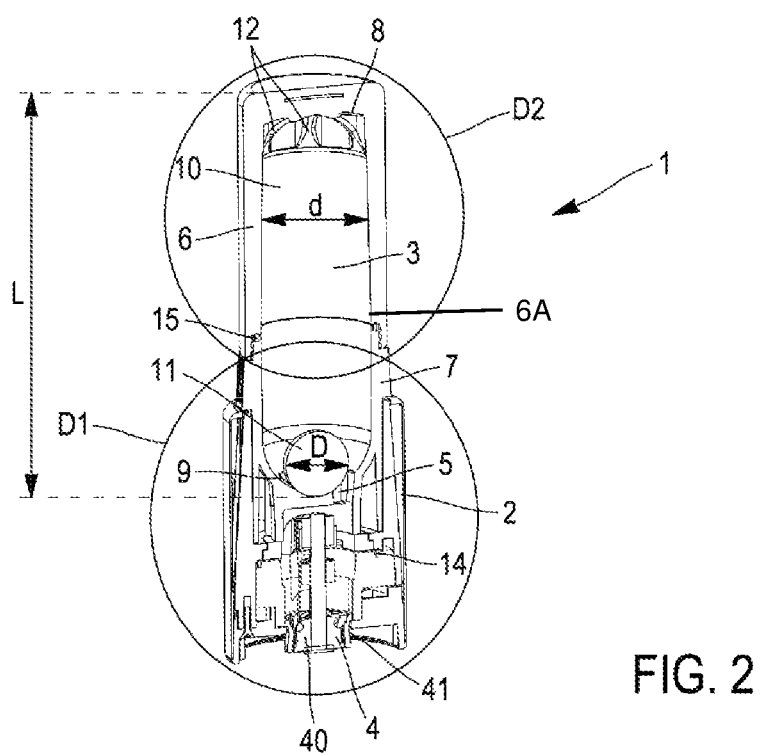
FIG. 2 is a longitudinal sectional view of the mill of FIG. 1.
Figure 3:
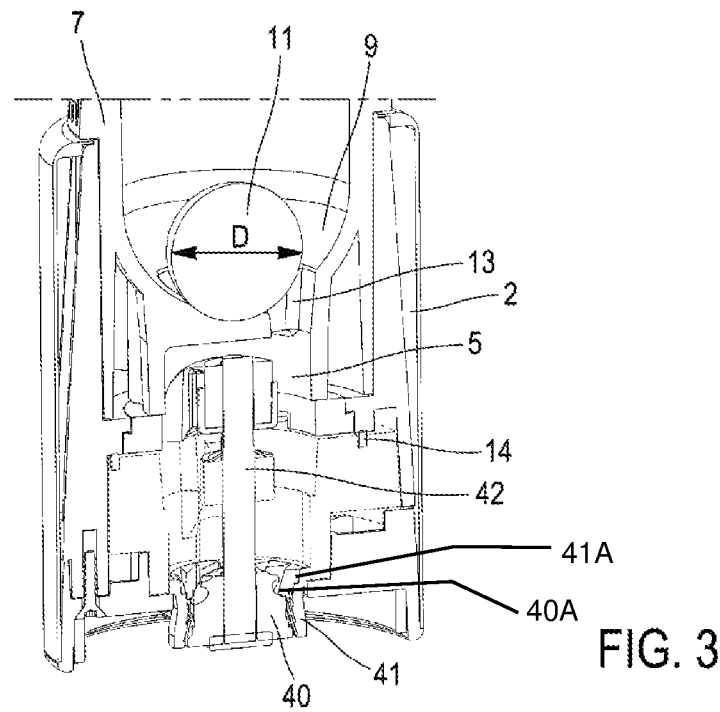
FIG. 3 is an enlarged sectional view of detail D1 of FIG. 2.
Figure 4:
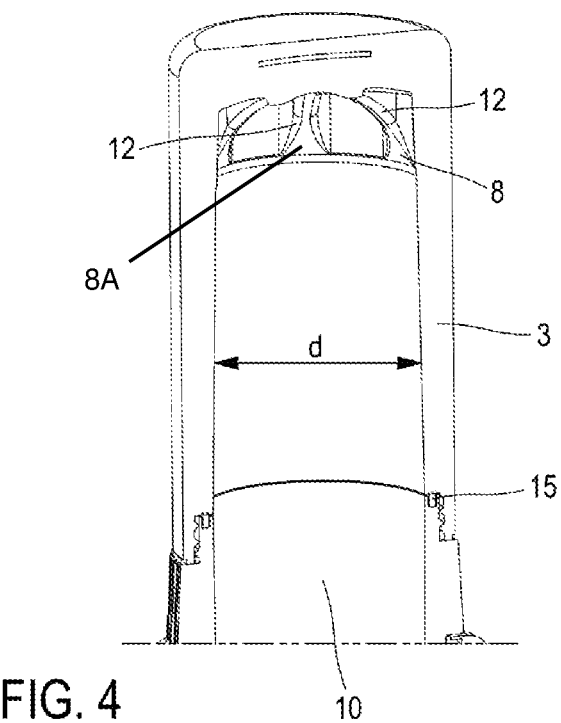
FIG. 4 is an enlarged sectional view of detail D2 of FIG. 2.
Figure 5:
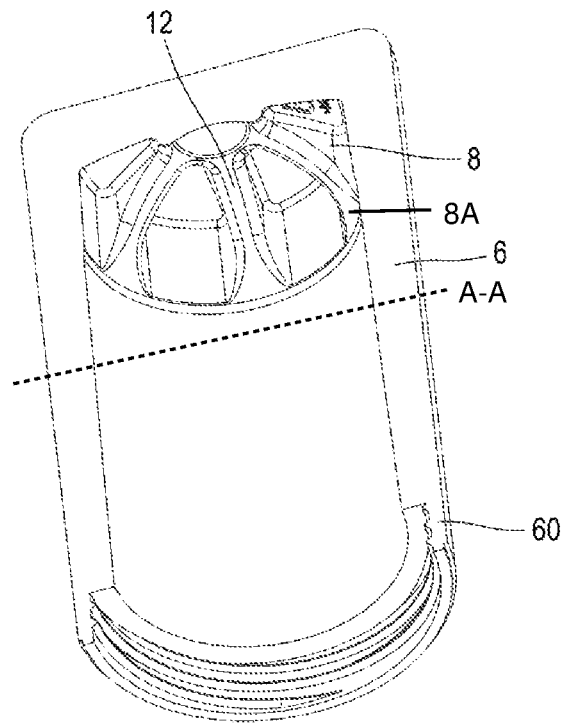
FIG. 5 is a longitudinal sectional view of the upper part of the reservoir belonging to the mill of FIG. 1.
Figure 6:
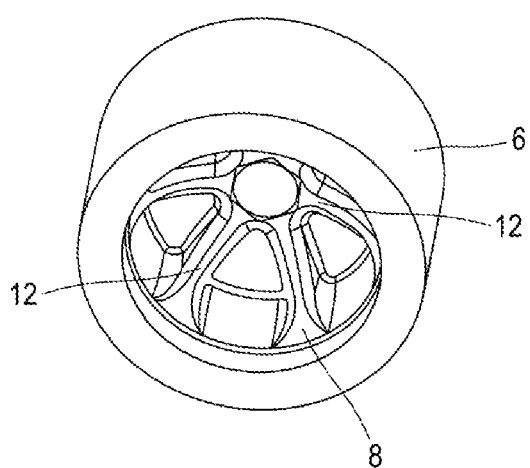
FIG. 6 is a bottom perspective sectional view of the upper part across line A-A of FIG. 5 of the reservoir belonging to the mill of FIG. 1.
Figure 7:
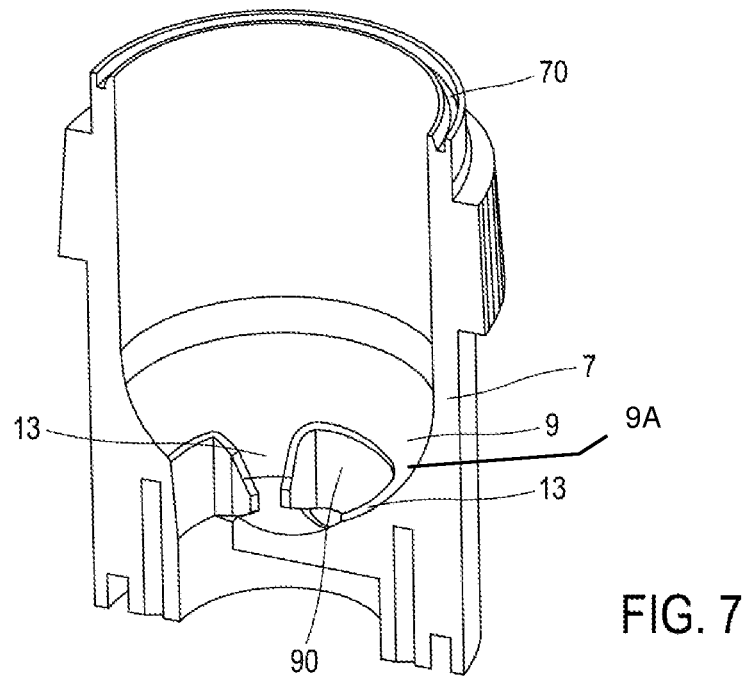
FIG. 7 is a longitudinal sectional view of the lower part of the reservoir belonging to the mill of FIG. 1.

In reference to FIGS. 2 and 4, in the illustrated embodiment variant, the reservoir 3 is defined by a hollow cylinder 6A, having a length (reservoir height L) in the order of 15 cm and an inner cylinder diameter d in the order of 4 cm. The reservoir 3 is closed by an arch (top arched surface 8) and a bottom (bottom arched surface 9) and is provided with a plurality of inlet orifices 90 (cf. FIG. 7) in the bottom arched surface toward the passage 5, specifically molded so as only to allow fragments to pass whose size is adapted to the grinding means or mechanism 4 with which the mill 1 is equipped, the others remaining retained in the reservoir 3 until they have the required size.

More specifically, the reservoir 3 is made up of a first part, called "upper part" 6, and a second part, called "lower part" 7, which are separable, respectively including the arch 8 and the bottom 9 (the top ached surface 8 being in the upper part 6, the bottom arched surface 9 being in the lower part 7). The lower end 60 of the upper part 6 and the upper end 70 of the lower part 7 have a complementary structure, so as to allow nesting thereof. Furthermore, the presence of a thread on each of the ends 60, 70 makes it possible to ensure, in their nested state, the blocking in position of the upper 6 and lower 7 parts relative to one another. Providing such a two-part structure of the reservoir 3 makes it possible, after separation of the upper part 6 from the lower part 7, to offer access to the inner volume 10 of the reservoir 3, in particular in order to arrange the spice product to be ground therein.

It should be noted that in the illustrated embodiment variant, the lower part 7 and the body 2 of the mill 1 are rotated relative to one another, the bulb 40 of the grinding mechanism 4 being secured to the lower part 7, while the cup 41 is secured to the body 2.

According to the invention, a ball 11, for example made from metal, the mass m of which is in the order of 65 g, and the diameter D of which is in the order of 2 cm, is positioned freely in the inner volume 10 of the reservoir 3, in which it is therefore able to move in all directions under the action of shaking of the mill 1 by a user. Indeed, the ball 11, projected on a spice product contained in the reservoir 3, makes it possible to mix the latter and to reduce it to small and homogeneous fragments, able to pass through the orifices 90 and to be gradually introduced into the passage 5 to feed the grinding mechanism 4 with particles that the latter is able to transform into quality powder.

According to the invention, the dimensions of the reservoir 3 and the ball 11, as well as the mass thereof, are specifically calculated to allow effective fractionation of all spice products that are dry and hard in raw state, irrespective of their shape, size or density. Thus, the mill 1 according to the invention has a certain versatility and is suitable for reducing to powder with a high gustatory quality, adequate particle size and pleasant texture, all spices or herbs having a dry and hard nature, that is to say both cinnamon and star anise, as well as long pepper or cloves, etc.

Furthermore, it should be noted that in the considered embodiment variant, the reservoir 3 has a diameter d equal to two times the diameter D of the ball 11. Such a feature advantageously makes it possible to prevent the spice product from remaining jammed in the reservoir 3, between the inner face thereof and the ball 11, and to guarantee that it continuously feeds the grinding mechanism, once reduced into small fragments able to enter the passage 5.

Furthermore, as illustrated in the figures, the inner face of the reservoir 3 includes a plurality of ribs 12, 13 respectively distributed, radially, on its arch 8 and its bottom 9 (top arched surface 8 has an inner arched top face 8A with inner arched top ribs 12, the bottom arched surface 9 has an inner arched bottom face 9A with inner arched bottom ribs 13). Adjacent inner arched bottom ribs 13 can be placed around each of the various inlet orifices 90 toward the passage 5. In short, these ribs define a plurality of protuberances pointing toward the inner volume 10 of the reservoir 3 and on which the ball 11 and the spice product undergo additional impacts, thus improving the fragmentation and the mixing of said product.

In order to guarantee the solidity and the robustness of the mill 1, damping means are provided, defined by two rings 14, 15 made from an elastomeric material arranged, for one, between the reservoir 3 and the grinding mechanism 4, and for the other, between the upper 6 and lower 7 parts of the reservoir 3. These rings 14, 15 make it possible to absorb the impacts due to the successive movements of the ball 11 in the reservoir 3 and to preserve the integrity of the component elements of the mill 1 and therefore the safety of the user.

In the illustrated embodiment variant, the grinding means 4 (toothed bulb 40, toothed cup 41, and rod 42) also advantageously includes means for mixing (toothed bulb surface 40A and toothed cup 41A surface) the fragments of spice product introduced into the passage 5 making it possible to prevent pieces from stagnating therein.

Figure 8:
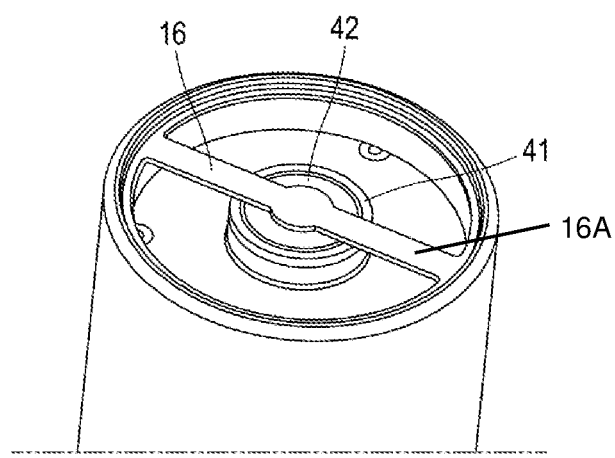
FIG. 8 illustrates a bottom perspective view of a part of the mill of FIG. 1, seen from below.

Means for adjusting 16 fineness of the grinding, making it possible to adjust the distance extending between the outer wall of the bulb 40 and the inner wall of the cup 41 are also provided in the embodiment variant illustrated in the cam 16A attached to the rod 42 in FIG. 8.

In practice, during the use of the mill 1 according to the invention, the user first introduces the spice product to be ground into the reservoir 3 by accessing its inner volume 10 following a separation of the upper 6 and lower 7 parts. Once the latter are reassembled, it suffices first for the user to shake the mill 1 at a substantially constant speed in order for the spice product to be fragmented into several small parts able to pass through the orifices 90 at the bottom of the reservoir and to enter the space extending between the bulb 40 and the cup 41. A rotational movement applied for example to the body 2 of the mill 1 relative to the lower part 7 of the reservoir 3 makes it possible to cause the rotation of the cup 41 relative to the bulb 40, and therefore to grind the spice product previously fragmented into fine powder.

We claim:

1. A mill for spice products, comprising:
   a reservoir so as to store spice products,
   wherein said reservoir is comprised of a means for fragmenting spice products into fragmented spice products,
   wherein said means for fragmenting being comprised of a crushing means, and
   wherein said crushing means is comprised of a solid body positioned freely within said reservoir;
   a grinding means for fragmented spice products into powdered spice products in communication with said reservoir; and
   a passage connecting said reservoir and said grinding means.

2. The mill, according to claim 1,
   wherein said reservoir is comprised of:
   a hollow cylinder having an inner cylinder diameter, a top arched surface, and a bottom arched surface opposite said top arched surface, and
   at least one inlet orifice in said bottom arched surface in communication with said passage so as to pass fragmented spice products to said grinding means, and
   wherein said solid body is comprised of a ball with ball diameter, said ball diameter being smaller than said inner cylinder diameter.

3. The mill, according to claim 2, wherein said inner cylinder diameter is greater than or equal to two times said ball diameter.

4. The mill, according to claim 3, wherein said ball has a ball mass between 55 g and 75 g, and wherein said reservoir has a reservoir height between 3 cm and 15 cm.

5. The mill, according to claim 1, wherein said top arched surface has an inner arched top face with inner arched top ribs, and wherein said bottom arched surface has an inner arched bottom face with inner arched bottom ribs.

6. The mill, according to claim 5 wherein said inner arched top ribs are distributed radially over said inner arched top face, and wherein said inner arched bottom ribs are distributed radially over said inner arched bottom face.

7. The mill, according to claim 6, wherein said reservoir is further comprised of another inlet orifice in said bottom arched surface, and wherein each inlet orifice is between adjacent inner arched bottom ribs.

8. The mill, according to claim 1, further comprising:
   damping means positioned between said reservoir and the grinding means.

9. The mill, according to claim 8, wherein the damping means is comprised of an elastomeric ring.

10. The mill, according to claim 1, wherein said hollow cylinder is comprised of an upper part and a lower part, said top ached surface being in said upper part, said bottom arched surface being in said lower part.

11. The mill, according to claim 10, further comprising:
    another damping means positioned between said upper part and said lower part.

12. The mill, according to claim 1, wherein the grinding means comprises means for adjusting fineness.

13. The mill, according to claim 1, wherein the grinding means comprises means for mixing fragmented spice products.

* * * * *